(12) United States Patent  
Huang

(10) Patent No.: US 8,321,442 B2  
(45) Date of Patent: Nov. 27, 2012

(54) SEARCHING AND MATCHING OF DATA

(75) Inventor: Xinrong Huang, Shanghai (CN)

(73) Assignee: Business Objects Software Limited (IE)

( * ) Notice: Subject to any disclaimer, the term of this patent is extended or adjusted under 35 U.S.C. 154(b) by 95 days.

(21) Appl. No.: 12/876,173

(22) Filed: Sep. 6, 2010

(65) Prior Publication Data

US 2011/0320481 A1 Dec. 29, 2011

(30) Foreign Application Priority Data

Jun. 23, 2010 (CN) .......................... 2010 1 0207109

(51) Int. Cl.
*G06F 7/00* (2006.01)
*G06F 17/30* (2006.01)
(52) U.S. Cl. ........................................ 707/760; 707/769
(58) Field of Classification Search .................. 707/748, 707/759, 760, 769
See application file for complete search history.

(56) References Cited

U.S. PATENT DOCUMENTS

| 4,689,743 | A | * | 8/1987 | Chiu | ................................ 341/20 |
| 4,879,653 | A | * | 11/1989 | Shinoto | ........................ 715/264 |
| 5,337,233 | A | * | 8/1994 | Hofert et al. | ................... 715/234 |
| 6,226,638 | B1 | * | 5/2001 | Okura et al. | ........... 707/999.003 |
| 6,292,768 | B1 | * | 9/2001 | Chan | .................................. 704/1 |
| 6,567,549 | B1 | * | 5/2003 | Marianetti et al. | ............. 382/189 |
| 7,689,554 | B2 | * | 3/2010 | Jones et al. | ............. 707/999.004 |
| 8,209,169 | B2 | * | 6/2012 | Imoto et al. | .................... 704/231 |
| 2001/0032073 | A1 | * | 10/2001 | Boehme | ........................ 704/229 |
| 2004/0107205 | A1 | * | 6/2004 | Burdick et al. | ................. 707/102 |
| 2005/0005240 | A1 | * | 1/2005 | Reynar et al. | ................. 715/533 |
| 2007/0203894 | A1 | * | 8/2007 | Jones et al. | ........................ 707/3 |
| 2008/0126335 | A1 | * | 5/2008 | Gandhi et al. | ..................... 707/5 |
| 2009/0006087 | A1 | * | 1/2009 | Imoto et al. | .................... 704/231 |
| 2009/0024183 | A1 | * | 1/2009 | Fitchmun | ........................ 607/56 |
| 2009/0043741 | A1 | * | 2/2009 | Kim | ................................ 707/3 |
| 2009/0299974 | A1 | * | 12/2009 | Kataoka et al. | .................... 707/3 |
| 2010/0010977 | A1 | * | 1/2010 | Choi et al. | ........................ 707/4 |
| 2010/0153396 | A1 | * | 6/2010 | Margulies et al. | ............. 707/737 |
| 2010/0271311 | A1 | * | 10/2010 | Fux et al. | ...................... 345/169 |
| 2010/0332325 | A1 | * | 12/2010 | Holte | ......................... 705/14.54 |

\* cited by examiner

*Primary Examiner* — Phong Nguyen
(74) *Attorney, Agent, or Firm* — Horizon IP Pte Ltd

(57) ABSTRACT

Described herein is a technology for facilitating searching and matching of data. In some implementations, an input data string, including one or more ideographic elements, is received and converted to a Latin-based input data string. One or more input keys may be generated based on the Latin-based input data string. A reference database may be searched for one or more candidate records indexed by at least one of the one or more input keys. If the one or more candidate records are found, a match score is determined for the one or more candidate records.

39 Claims, 15 Drawing Sheets

Table1

| ID | LANGUAGE_TEXT | PHONETIC_KEY |
|---|---|---|
| 1 | 黄 | HAN |
| 2 | 王 | WAN |
| 3 | 上海 | SANHA |
| 4 | 山海 | SANHA |
| 5 | ... | ... |

Fig. 4a select DATA from Table1 where PHONETIC_KEY = "SANHA"

select DATA from Table1 where PHONETIC_KEY like "SAN%"

Fig. 4b (i) Silent element = "H"

(ii) Silent elements = "H" and "G"

(iii) Silent elements = "U" and "G"

(iv) Silent element = "U"

(v) Silent elements = "H" and "I"

(i) Sound-alike (X) = "S"

(ii) Sound-alike (J) = "Z"

(iii) Sound-alike (X) = "S"
Silent element = "I"

(i) Mandarin and Shanghainese (ii) Mandarin and Cantonese

| ID | Locality | Standard Key | Phonetic Key | Radical Key | Stroke Key |
|---|---|---|---|---|---|
| 1 | 上海 | 上海 | SANHA | HHGGITXU | 2114413155414 |
| 2 | 山海 | 山海 | SANHA | HHGGITXU | 2524413155414 |
| 3 | ... | ... | ... | ... | ... |

SEARCHING AND MATCHING OF DATA

TECHNICAL FIELD

The present disclosure relates generally to searching and matching of data.

BACKGROUND

Searching and matching techniques provide useful ways to cleanse and standardize data in databases to improve its data quality. For example, some data in the database may be incorrect due to user input errors. Common sources of errors include entering strings that "look-like" or "sound-like" the intended data. Such input data may be corrected by finding a candidate record from the reference universe that fuzzily matches the incorrect input data, and replacing the incorrect input data with the matching candidate data before storing it in the database.

One type of phonetic fuzzy matching method is the Soundex algorithm, which was first developed by Robert C. Russell and Margaret K. Odell in 1918 and 1922. See U.S. Pat. Nos. 1,261,167 and 1,435,663, which are hereby incorporated by reference. The Soundex algorithm indexes data by sound, as pronounced in English, by encoding homophones to the same representation or key, so that they can be matched despite minor differences in spelling. To compare two given strings, the Levenshtein distance (or edit distance) may be determined. The Levenshtein distance measures the difference between two strings by calculating the least number of edit operations that are necessary to modify one string to obtain another string.

The problem with conventional algorithms, however, is that they are not well-suited for ideographic or non-English characters, such as Chinese or Japanese characters. The phonetic rules used in conventional phonetic algorithms are designed for English pronunciations, and not for pronunciations of other languages. In addition, conventional phonetic algorithms do not take into account possible different pronunciations by different dialect groups. Similarly, Levenshtein algorithms may not be directly applicable to ideographic or non-Latin strings because of their short-string formats.

Therefore, there is a need for an improved searching and matching framework that addresses the above-mentioned challenges.

SUMMARY

A computer-implemented technology for facilitating searching and matching of data is described herein. In some implementations, an input data string, including one or more ideographic elements, is received and converted to a Latin-based input data string. One or more input keys may be generated based on the Latin-based input data string. A reference database may be searched for one or more candidate records indexed by at least one of the one or more input keys. If the one or more candidate records are found, a match score is determined for the one or more candidate records.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4a illustrates a portion of an exemplary reference database;

FIG. 4b shows exemplary SQL query statements;

FIG. 7a shows an exemplary matrix for computing the Levenshtein distance;

FIG. 7b shows a possible path through an exemplary matrix;

DETAILED DESCRIPTION

Figure 1:
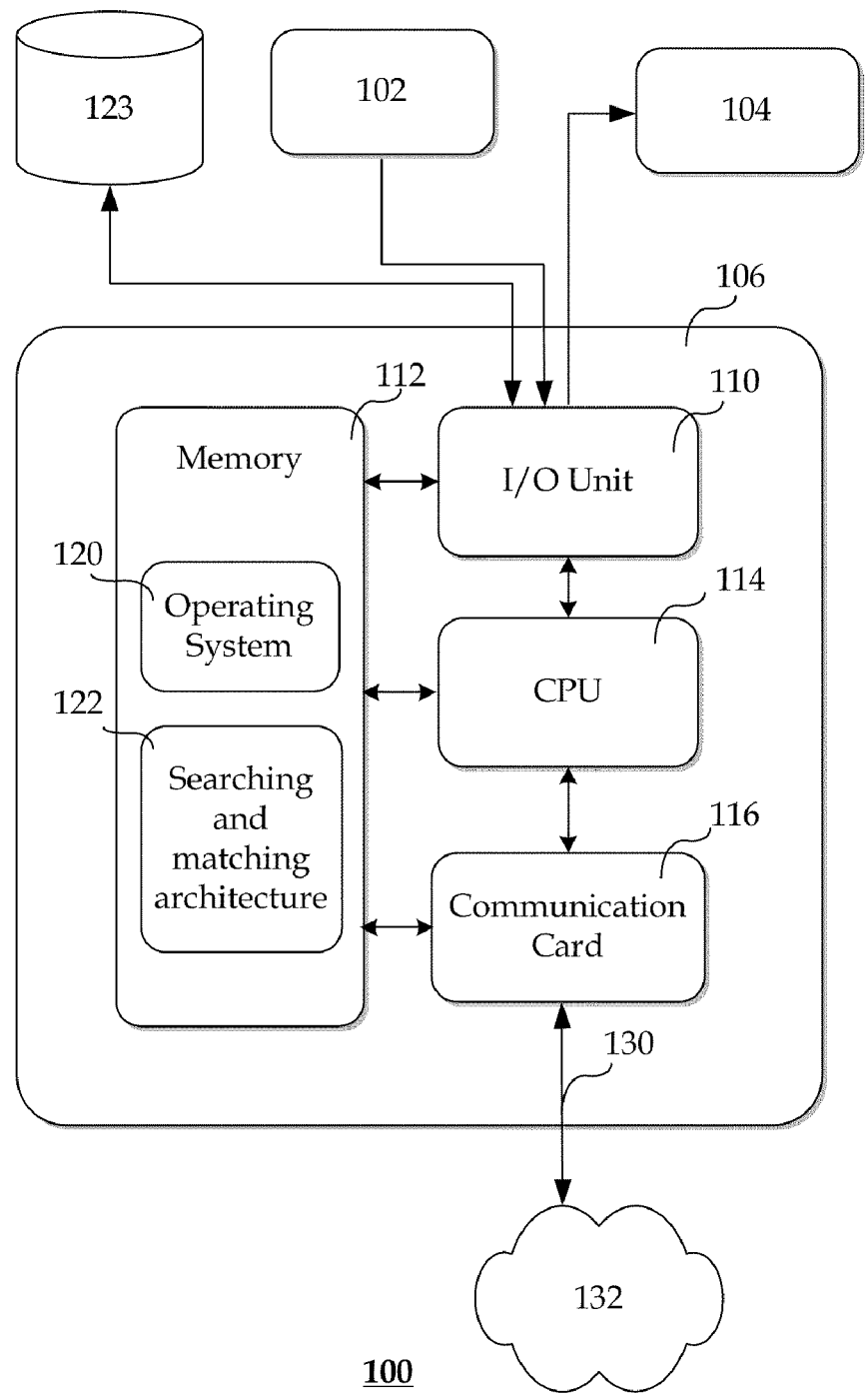
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for searching and matching of data is described herein. The searching and matching framework may be used, for example, to facilitate correction of errors in input data so as to ensure high data quality. Errors that may be corrected include, for example, common editorial mistakes or "sounds-like" and/or "looks-like" misspellings. One significant advantage of the present framework is its compatibility with ideographic, logographic or non-Latin-based strings, such as Chinese, Japanese, Korean or Vietnamese, and their respective dialects. For purposes of illustration, the present framework is described in the context of Chinese characters. However, it should be noted that the present framework may also be applied to other types of ideographic-based languages, such as non-Asian or non-Latin languages (e.g., Arabic) that can be converted into Latin-based strings.

In one implementation, the present framework performs a phonetic fuzzy search to match the input data to one or more "sounds-like" candidates from a reference database. The phonetic fuzzy search may be performed by using a phonetic key (or code) that is generated based on the input data string. In one implementation, the phonetic key is generated by converting characters into Latin-based phonetic spellings, and further encoding the phonetic spellings to Latin-based phonetic keys according to various rules. The phonetic key may then be used to retrieve "sounds-like" candidates from the reference database to correct possible "sounds-like" misspellings in the input data.

In another implementation, the present framework performs a radical fuzzy search and/or stroke fuzzy search to match the input data to one or more "looks-like" candidates in the reference database. Radicals and strokes are based on the appearance of ideographic characters. The radical and stroke fuzzy searches may be performed by using an input radical key and an input stroke key respectively. In some implementations, the radical and stroke keys are generated by converting input ideographic characters into more basic constituent components (i.e. radicals or strokes) and representing each component with a Latin alphabet or digit. The radical and/or stroke keys may then be used to retrieve "looks-like" candidates to correct possible "looks-like" misspellings in the input data.

The reference database may be indexed by lookup keys that are derived in a manner similar to that of the input keys. For example, the lookup keys may comprise standard keys, phonetic keys, radical keys, stroke keys, or a combination thereof, which are derived from the language text of the respective records in the reference database. Multiple records may be indexed by a common lookup key to allow for a "fuzzy" search that returns candidates that are sound or look similar.

The framework described herein may be implemented as a method, computer-controlled apparatus, a computer process, a computing system, or as an article of manufacture such as a computer-usable medium. These and various other features will be apparent from the following description.

Exemplary System

FIG. 1 shows a block diagram illustrating an exemplary system 100 that may be used to implement the framework described herein. System 100 may include a computer system 106 communicatively coupled to an input device 102, an output device 104 and a peripheral storage device 123.

Input device 102 may be specially designed for entry of ideographic characters. For example, the input device 102 may comprise a keyboard where each key corresponds to a particular stroke type (horizontal, vertical, left-falling, right-falling, turning, etc.). Alternatively, the input device 102 may comprise a pen and a graphics tablet for use by a user to naturally write the entire character on the tablet. A handwriting recognition system may be used to find the character that most closely matches the strokes entered by the user on the tablet. Other types of input devices, such as a QWERTY keyboard, a phonetic keyboard, a mouse, a touchpad, a microphone or a video camera, may also be used. Output device 104 includes, for example, a display device, a printer, a speaker and/or any other types of suitable devices. The peripheral storage device 123 may include volatile memory (e.g., random-access memory), non-volatile memory (e.g., read-only memory, hard disk, etc.) or a combination of both. Peripheral storage device 123 may store, for example, a reference database or any other information that may be used by the present framework.

Computer system 106 includes a central processing unit (CPU) 114, an input/output (I/O) unit 110, and a memory device 112. Other support circuits, such as a cache, power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory device 112 stores machine-executable instructions, data, and various programs, such as an operating system 120 and the searching and matching architecture 122 for implementing the techniques described herein, all of which may be processed by CPU 114. As such, the computer system 106 is a general-purpose computer system that becomes a specific purpose computer system when executing the machine-executable instructions. Alternatively, the various techniques described herein may be implemented as part of a software product, which is executed via the operating system 120. Each computer program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Memory device 112 may be any form of non-volatile memory, including by way of example semiconductor memory devices, such as Erasable Programmable Read-Only Memory (EPROM), Electrically Erasable Programmable Read-Only Memory (EEPROM), flash memory device, magnetic disk, internal hard disk, removable disk, magneto-optical disk, or Compact Disc Read-Only Memory (CD-ROM).

Computer system 106 may be communicatively coupled to one or more other computer systems (not shown) via network 132. For example, computer system 106 may operate in a networked environment using logical connections to one or more remote computers (not shown). The remote computer may be another personal computer, a server, a router, a network PC, a peer device or other common network node, and typically includes many or all of the elements described above relative to computer system 106. Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN).

Figure 2:
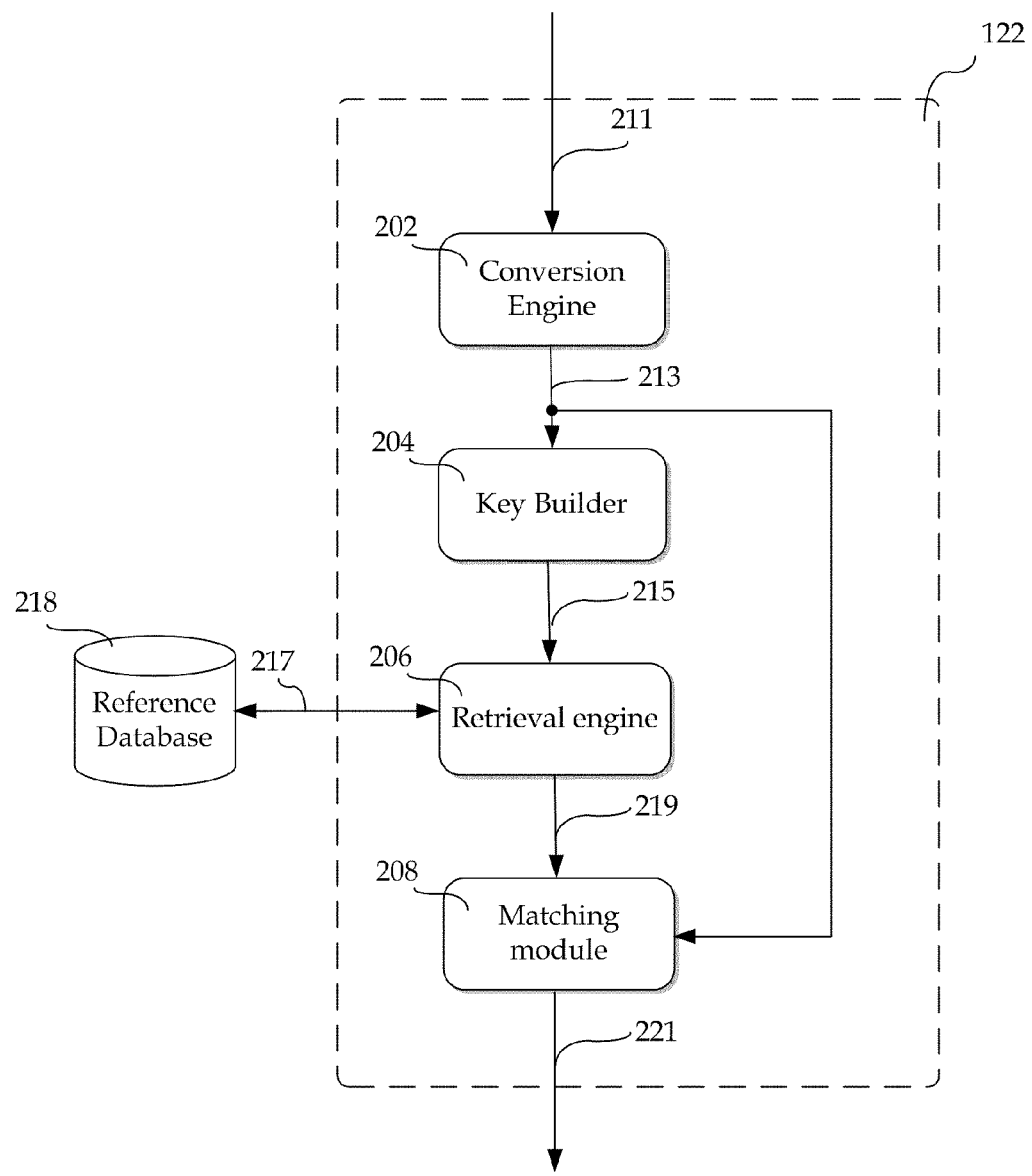
FIG. 2 is a block diagram illustrating an exemplary searching and matching architecture.

FIG. 2 is a block diagram illustrating an exemplary searching and matching architecture 122. In one implementation, the architecture 122 includes a conversion engine 202, a key builder 204, a retrieval engine 206 and a matching module 208. The architecture 122 may include other components, such as a user interface for receiving input data. The architecture 122 is language independent. The various components shown in FIG. 2, for example, are generic and may be adapted to be used for any language. For purposes of discussion, however, the architecture 122 is described in the context of Chinese language.

The conversion engine 202 may be configured to receive input data string 211, which includes language text of a given language. In one implementation, the language text comprises one or more ideographic (or logographic) elements, such as Chinese characters. The Chinese characters may be simplified or traditional Chinese characters. Other types of ideographic elements include, but are not limited to, Japanese, Korean, Vietnamese character sequences, or other Asian or non-Asian languages.

The input data string 211 may be provided by a user via a user interface. The user may, for example, manually provide the input data 211 via an input device 102 (e.g., keyboard, mouse, microphone, graphics tablet, etc.). Alternatively, the input data string 211 may be retrieved from a database, such as an object-oriented database, a relational database, an object-relational database or any other type of data management system. The database may be stored locally in memory device 112, or remotely in a peripheral storage device 123 or another computer system (not shown). A data mining software component that executes on the computer system 106 may be used to extract the input data strings stored in the database.

The conversion engine 202 may be configured to convert the input data string 211 to Latin-based input data string 213. In one implementation, the conversion engine 202 further includes an image recognition module configured to identify one or more ideographic characters, radicals or strokes in the input data string 211 for conversion into Latin characters. The conversion of ideographic-based data 211 to Latin-based data 213 advantageously allows the direct application of various fuzzy search and match techniques (e.g., edit-distance algorithms) on the Latin-based data, which will be described in more detail later.

In some implementations, the conversion engine 202 is configured to convert the input data string 211 to one or more phonetic spellings 213 of the ideographic elements in the input data string 211. The phonetic spelling comprises one or more Latin characters that represent the pronunciation or sounds made when speaking the given language.

Figure 3A:
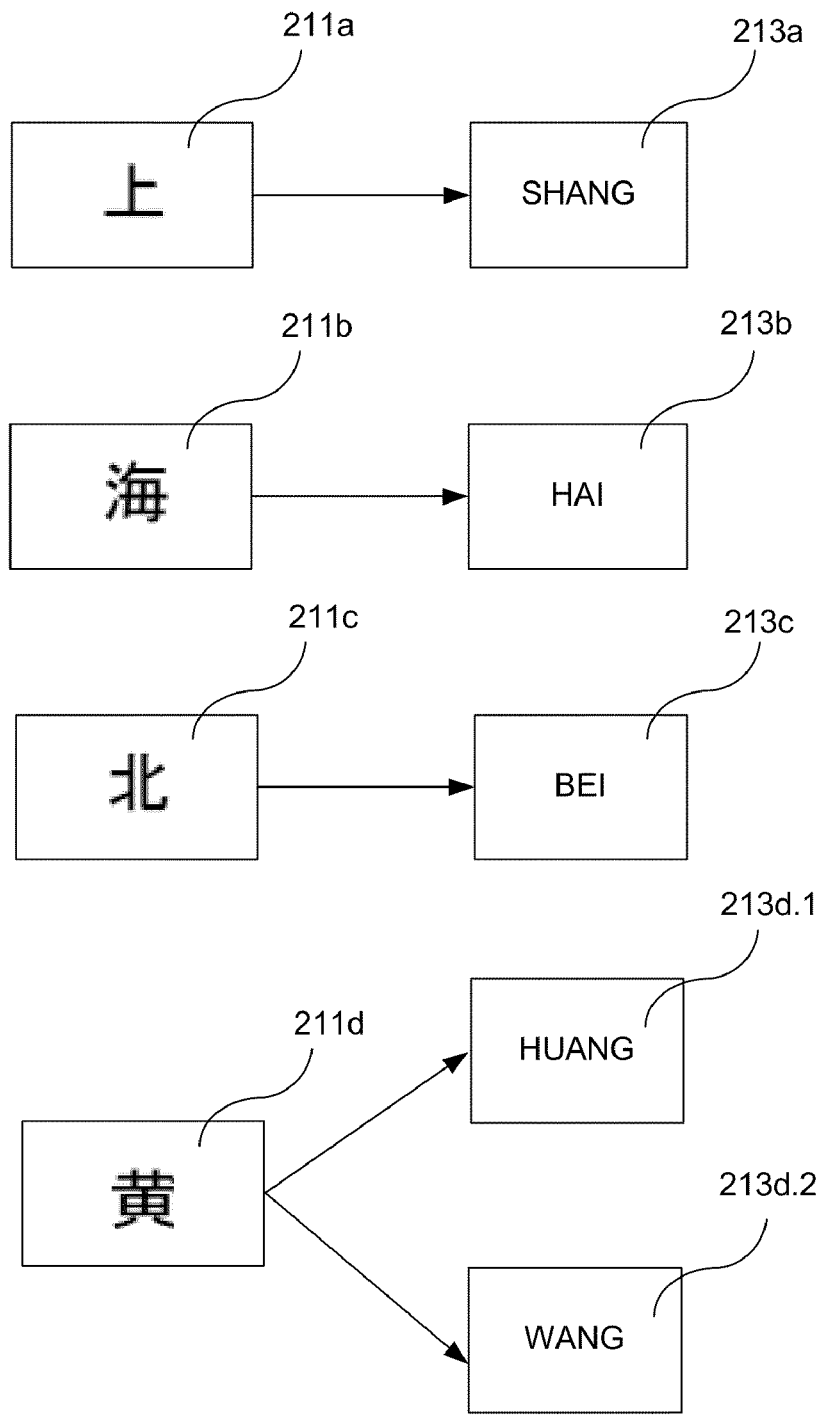
FIG. 3a illustrates exemplary conversions of language text to phonetic spellings.

FIG. 3 illustrates exemplary conversions of input data 211a-d to corresponding Latin-based input data 213a-d in the context of Chinese language. In such case, the conversion engine 202 is configured to convert Hanzi to Pinyin. That is, the ideographic input data 211a-d is Hanzi, while the Latin-based input data 213a-d is Pinyin. It should be noted, however, that the architecture 122 is language independent and may be used for other languages.

The phonetic conversion may be a one-to-one mapping or a one-to-many mapping. For example, input data string 211a is converted to a single phonetic spelling 213a, while input data string 211d is converted to multiple phonetic spellings (213d.1 and 213d.2). The one-to-many mapping arises because of different pronunciations. Different pronunciations may be due to different dialect groups pronouncing the same characters differently. For example, the Mandarin pronunciation of the Chinese character 211d is HUANG, whereas the Guangdong dialect group pronounces the same character 211d as WANG. Different pronunciations may also arise because of different contexts. For example, some characters may be pronounced differently when used in conjunction with different characters in a phrase.

Alternatively or additionally, the conversion engine 202 is configured to convert the input data string 211 to one or more sets of Latin characters, wherein a Latin character represents a constituent radical of an ideographic element in the input data string 211. The set of Latin characters comprises, for example, a set of alphas or Latin letters (e.g., "U," "I," "T," "F," "Q", etc.). It is understood that Latin numerals may also be used.

Figure 3B:
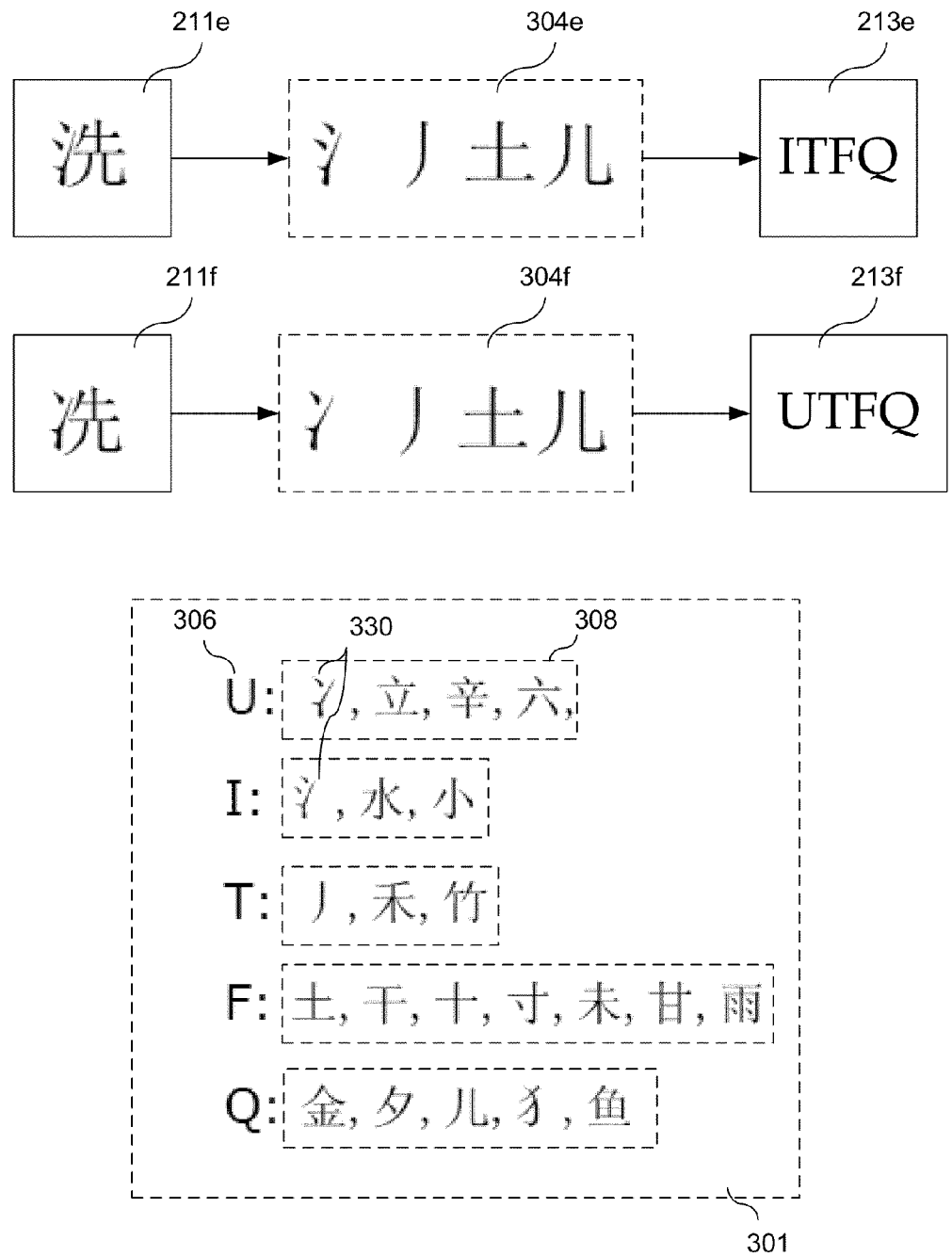
FIG. 3b illustrates exemplary conversions of language text to Latin-based radical strings.

FIG. 3b shows an exemplary conversion of Chinese characters 211e-f to a set of Latin characters 213e-f. As shown, the characters 211e-f may be deconstructed into respective constituent radicals 304e-f, and then converted to respective Latin-based strings 213e-f. The conversion of radicals 304e-f to Latin characters 213e-f may be achieved by looking up a data structure 301. As shown, the data structure 301 may cross reference each alpha 306 with a group of radicals 308. The grouping of radicals 308 may be defined according to the given language. In one implementation, the grouping is heuristically pre-defined based on the similarity in meaning or appearance of the radicals. The groupings shown in FIG. 3b are merely exemplary, and should not be construed to limit the present framework in any way.

The conversion engine 202 may also be configured to convert the input data string 211 to one or more sets of Latin characters, wherein a Latin character represents a constituent stroke of the ideographic elements in the input data string 211. A stroke is the most fundamental or basic component of a character or symbol of the given language text. A set of strokes may be used to build a radical. Strokes may be defined according to the given language. For example, a Chinese character comprises a set of 5 fundamental strokes: (1) horizontal stroke; (2) vertical stroke; (3) left-falling stroke; (4) right-falling stroke; and (5) turning stroke. Other types of fundamental strokes may also be defined.

Figure 3C:
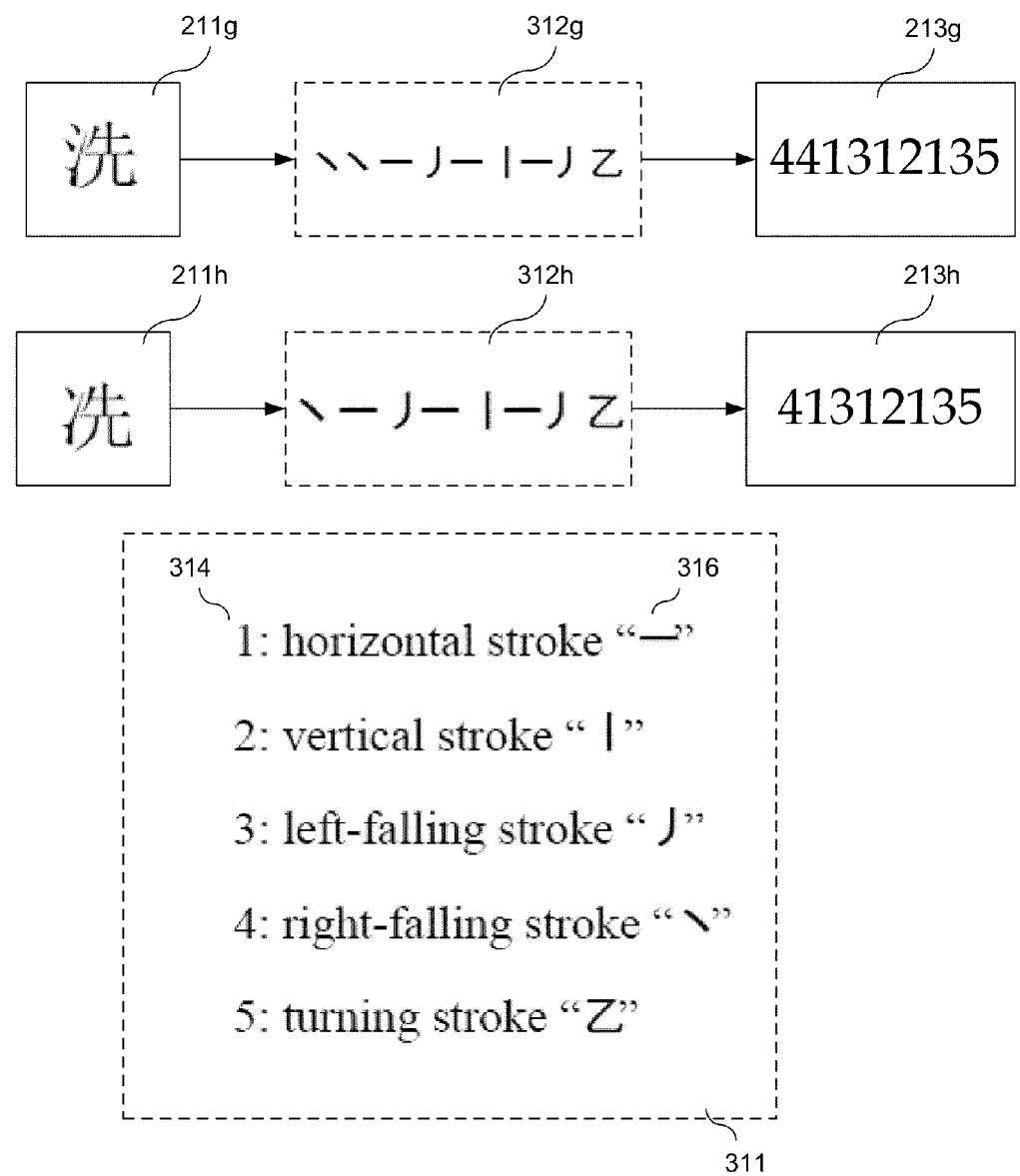
FIG. 3c illustrates exemplary conversions of language text to Latin-based stroke strings.

FIG. 3c shows an exemplary conversion of Chinese characters 211g-h to their respective strokes 312g-h, and subsequently to their respective Latin-based strings 213g-h. The conversion of strokes 312g-h to Latin characters 213g-h may be achieved by looking up a data structure 311. As shown, the data structure 311 may associate each digit 314 with a stroke 316. Although digits are shown for purposes of illustration, Latin letters or other symbols may also be used. In addition, even though five digits are illustrated, less or more than five Latin characters may also be used. It should also be noted that other methods of converting language text to Latin-based strings may also be applied.

Referring back to FIG. 2, the Latin-based input data 213 is passed to the key builder 204 for generating one or more look-up keys 215. The look-up keys 215 are used by the retrieval engine 206 to retrieve one or more candidate records 217 from a reference database 218 that stores language text that is likely to be representative of the input data intended by the user. The look-up keys 215 may comprise a phonetic key, a radical, a stroke key, a standard key or a combination thereof. A phonetic key is derived from the phonetic spelling of the input data 213, while the radical, stroke and standard keys are derived based on the appearance of the input data 213. The phonetic key enables the retrieval engine 206 to retrieve candidate records 217 from the reference database with language text that sounds similar to the input data 211. The radical, stroke and standard keys, on the other hand, may be used by the retrieval engine 206 to retrieve candidate records 217 with language text that looks similar to the input data 211. The derivation of the look-up keys 215 will be described in more detail later.

The retrieval engine 206 may be configured to initiate a search for candidate records 217 in a reference database 218 using a key 215 from the key builder 204. The reference database stores the ground truth information of the system 100. For example, the reference database may store valid addresses or product information. Input data may be validated against the truth information in the reference database 218. The reference database resides in a memory device of a database server, such as computer system 106 or another remote computer system (not shown) that connects to the computer system 106. The reference database server may be, for example, a relational database server, an object-oriented database server, an object-relational database server, a graph database server, a document-oriented database server, etc.

FIG. 4a shows an exemplary portion of a representative reference database 218. In some implementations, the reference database 218 is organized by an index table (Table 1). The use of an index table advantageously speeds up the retrieval of candidate records by avoiding full table scans.

Each record of the database 218 includes an identifier (ID) field 402, a language text field 404, and a key field 406. The index table (Table 1) is sorted by values in the key field 406. The key field 406 may include a phonetic key, a stroke key, a radical key or a standard key. It should be noted that these fields are merely exemplary, and other types of fields may also be provided. Additional fields may also be provided for storing additional keys for each record.

The ID field 402 stores a key that uniquely identifies each row (or record) in the index table (Table 1). The language text field 404 stores the written symbols or ideograms corresponding to the given language. The key field 406 stores a key that is generated by, for example, the key builder 204. In some implementations, the key field 406 comprises a phonetic key field. A phonetic key is generated based on the phonetic spelling of the given language text. Records with language text that sounds alike are indexed by a common phonetic key. For example, referring to FIG. 4a, records with ID=3 and ID=4 with similar sounding language text are indexed with a common phonetic key "SANHA."

If more than one phonetic key is generated for a given language text due to different pronunciations, one phonetic key may be selected and stored as the primary key in the reference database so as to minimize storage requirements. For example, the language text in the record with ID=1 may be pronounced as "HUANG" or "WANG", as previously discussed with reference to FIG. 3a. Accordingly, two phonetic keys "HAN" and "WAN" may be generated based on the language text. In some implementations, multiple phonetic keys are stored in each record. However, in order to save space, the key builder 204 may select the phonetic key "HAN" as the primary key, and store only the primary key in the record.

Figures 9A, 9B:
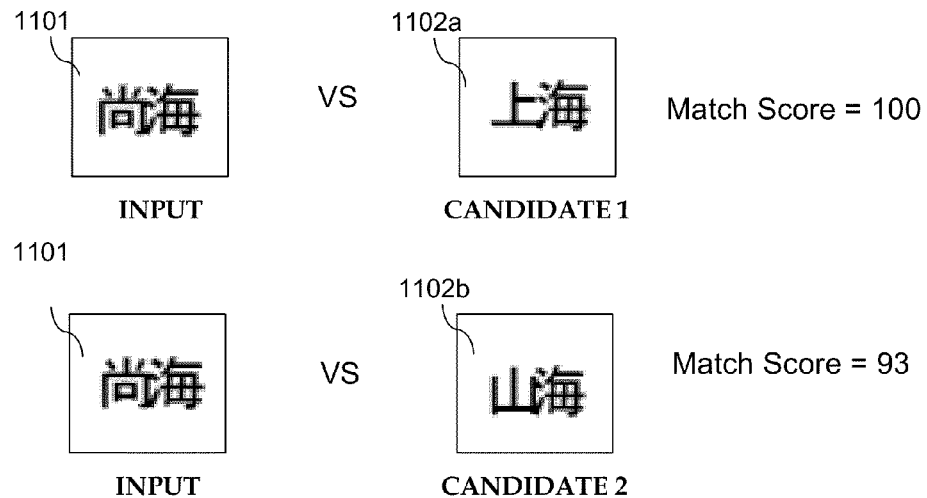
FIG. 9a illustrates an exemplary address cleansing application.
FIG. 9b shows a portion of an exemplary reference database.

In some implementations, multiple key fields are provided in each record. The key fields may comprise, for example, a standard key field, a phonetic key field, a radical key field, a stroke key field, or a combination thereof. One example of such a reference database 218 is shown in FIG. 9b, which will be discussed in more detail later. A standard key 1104 may be derived from the language text in accordance with various rules. In some implementations, the language text is processed to correct for common editorial mistakes so as to generate the standard key. For example, any non-language symbols (e.g., @, #, "$, etc.) or any repeat characters may be removed from the language text string. Where there are no editorial mistakes found, the standard key is the same as the input language text. Radical and stroke keys (1108 and 1110) are generated based on the radical or stroke constituent components of the language text respectively. Records with similar looking language text may be indexed with a common stroke key or a common radical key. More details of the phonetic, stroke and radical keys will be provided later.

Referring back to FIG. 2, the retrieval engine 206 may issue a query statement based on a look-up key 215 to the reference database server to extract one or more potentially matching candidate records 217. The query statement may conform to a query language that is supported by the reference database server. One example of a query language is structured query language (SQL), which is designed for managing data in relational databases. It is understood that other types of query languages may also be used.

FIG. 4b shows exemplary SQL query statements 412a-b that may be issued by the retrieval engine 206. A query operation in SQL is performed with the declarative "select" statement. The key field name (e.g., PHONETIC_KEY) and the key value (e.g., SANHA) are provided as a comparison predicate to constrain the search. For example, query statement 412a returns a list of records (or rows of data) from Table 1 where the phonetic key field contains "SANHA". Alternatively, query statement 412b may be issued to retrieve records which are indexed by a phonetic key starting with "SAN". Thus, with respect to the index table 218 shown in FIG. 4a, either statement (412a or 412b) will return a list with candidate records ID=3 and ID=4. It is understood that such query language elements are merely exemplary, and other statements, keywords, expressions, and/or clauses may also be used to specify other query conditions.

In addition, even though the SQL statements 412a-b refer to a phonetic key, other types of keys, such as a standard key, a stroke key or a radical key, may also be used. For example, in the context of a radical key, an exemplary SQL statement may be: select DATA from TABLE where RADICAL_KEY like "A %". As yet another example, an exemplary SQL statement using a stroke key may be: select DATA from TABLE where STROKE_KEY like "1%".

Turning back to FIG. 2, the candidate records 219 retrieved by the retrieval engine 206 are passed to the matching module 208 for evaluation. The matching module 208 evaluates the likelihood of the language text in the candidate records 219 matching the input data intended by the user. A candidate record yielding the highest match score indicates that the language text in the candidate record is most likely to be intended by the user, given that the input data 211 may include errors. The language text in such candidate record may then be used as a suitable edit to replace and thereby correct the input data 211.

In some implementations, the matching module 208 initiates a conversion of the language text string in the candidate record to a Latin-based representation of the language text before computing its match score. The conversion may be performed on-the-fly by providing the language text string to the conversion engine 202. Alternatively, the Latin-based representation of the language text string may be stored and retrieved from the reference database 218. Given the Latin-based representation of the candidate data 219 and the Latin-based input data string 213, the matching module 208 may be configured to determine a match score. The match score may be computed using, for example, an edit distance metric, as will be described in more detail later.

The matching module 208 may be configured to return results 221 based on the computed match scores. The results 221 may include, for example, language text of one or more candidate records with the highest match scores. The match score computation will be described in more detail in the following sections.

Exemplary Method

Figure 5:
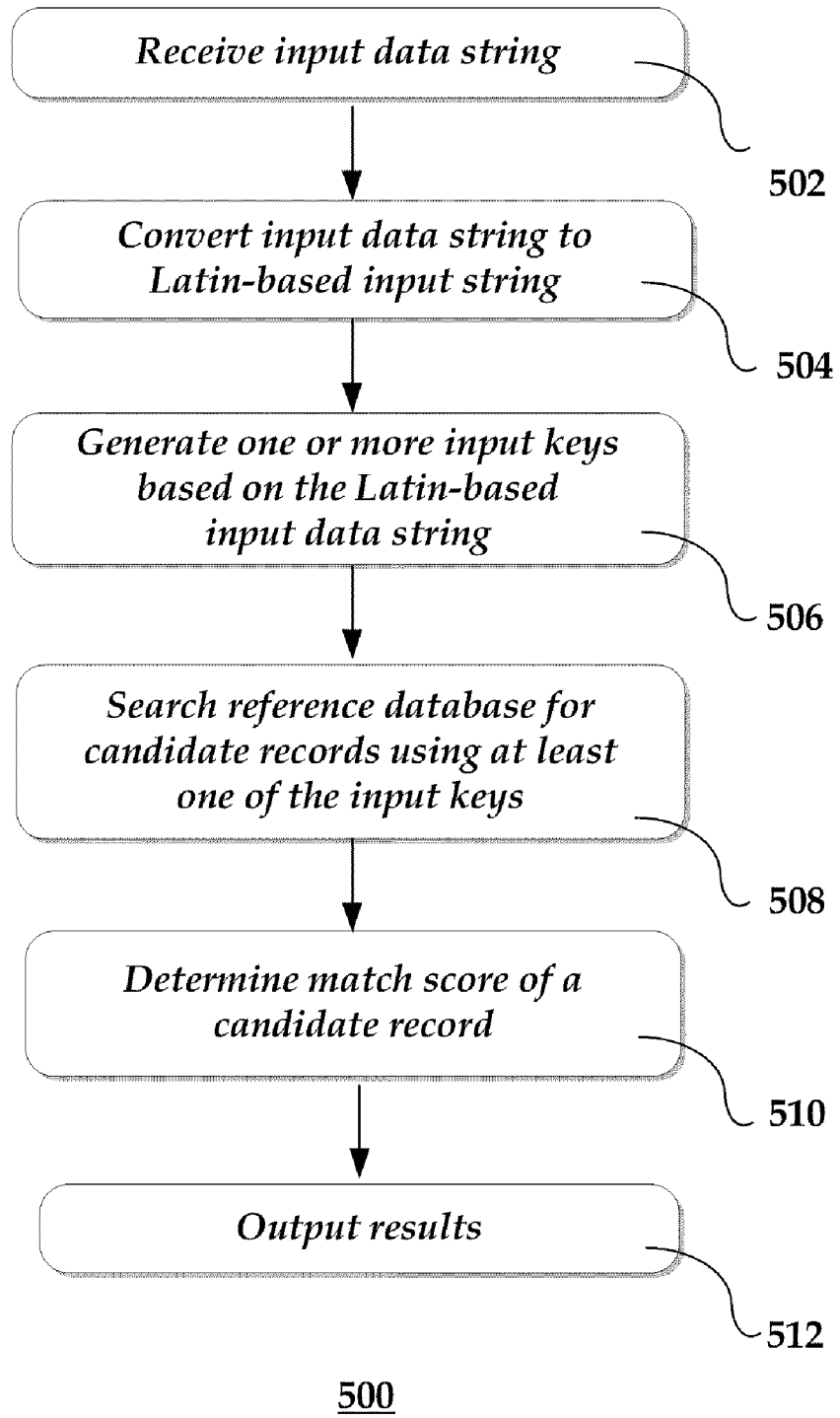
FIG. 5 shows an exemplary searching and matching method.

FIG. 5 shows an exemplary searching and matching method 500 which may be implemented by the system 100. It is to be noted that in the discussion of FIG. 5 and subsequent figures, continuing reference may be made to elements and reference numerals shown in FIGS. 1-4.

At 502, the computer system 106 receives an input data string. The input data string comprises language text, such as symbolic, ideographic or logographic elements of a given language (e.g., Chinese, Korean, Japanese or Vietnamese).

At 504, the conversion engine 202 of the computer system 106 converts the input data string to a Latin-based input data string. The Latin-based input data string comprises one or more letters (a, b, c, etc.) or numerals (1, 2, 3, etc.) from the Latin alphabet. In some implementations, the Latin-based input data comprises the phonetic spelling of the ideographic elements in the input data string 211. In the context of Chinese language, for example, Hanzi input data may be converted to Pinyin. As discussed previously, the present framework advantageously provides dialect support by converting a given language text string to one or more phonetic spellings.

At 506, the key builder 204 generates one or more input keys based on the Latin-based input data string. The one or more keys may include a phonetic key, a radical key, a stroke key, a standard key or a combination thereof. The one or more keys are provided to the retrieval engine 206 to look up records in the reference database 218. As discussed previously, the reference database 218 may be indexed such that records with language text that sounds alike (i.e. homophones) are indexed by a common phonetic key. Alternatively or additionally, the reference database 218 may be indexed such that records with language text that looks alike are indexed by a common standard key, radical key and/or stroke key.

A phonetic key may be derived from the phonetic spelling of the input ideographic elements in accordance to a pre-defined set of phonetic rules. In some implementations, the computer system 106 executes a set of one or more phonetic routines to encode the Latin-based input data to one or more corresponding phonetic keys. The phonetic routines include, for example, the silent routine and the sounds-like routine. It is understood that other types of phonetic rules or routines may also be applied.

The silent routine may include parsing a Latin-based string and removing any silent elements from the Latin-based string. An element refers to one or more letters, vowels, consonants, or a combination thereof. A silent element may be an element that can be omitted without substantially affecting the pronunciation of the language text. The silent elements may be pre-defined according to the type of language processed, and stored in a data structure (e.g., look-up table). For example, in the context of Chinese, exemplary silent elements include "H," "G," "I" and "U." The consonant "UANG" may be replaced by the consonant "ANG" by removing the silent element "U." Additional rules may also be defined in the silent routine. For example, the silent element may not be removed if it is the first or last remaining element of the Latin-based string.

Figure 6A:
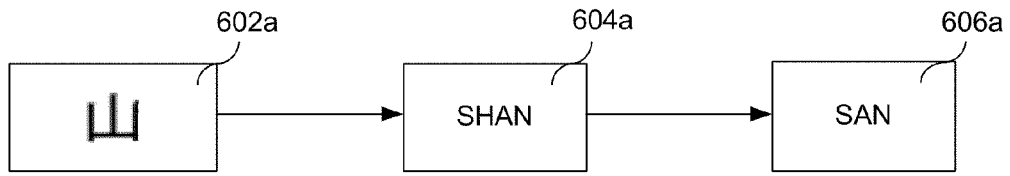
FIGS. 6a-e illustrate exemplary conversions of language text to phonetic keys.
Figure 6A:
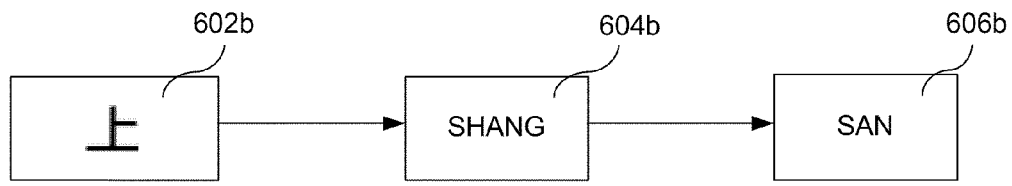
Figure 6A:
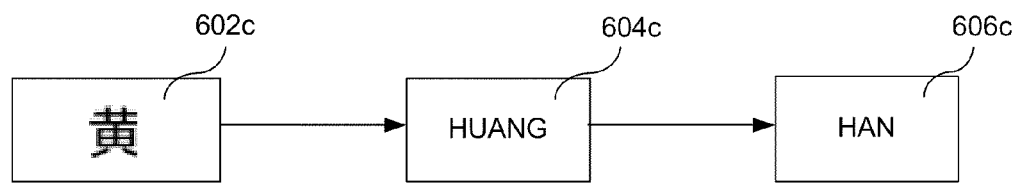
Figure 6A:
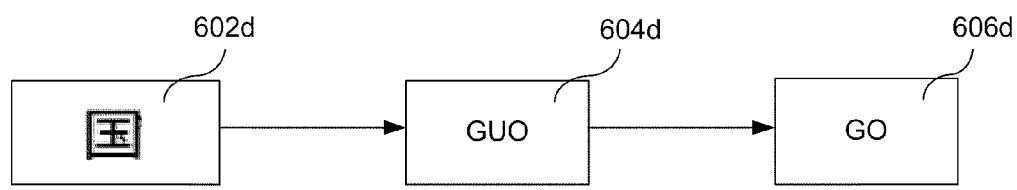
Figure 6A:
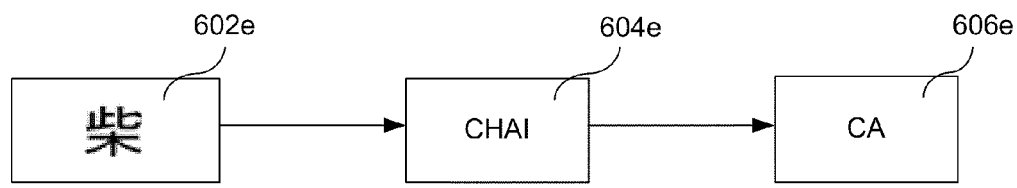

FIGS. 6a(*i*)-(*v*) illustrate exemplary applications of the silent routine. The conversion engine 202 may convert the ideographic element 602 to the Latin-based string 604, and the key builder 204 executing the silent routine may convert the Latin-based string 604 to the phonetic key 606. For example, FIG. 6a(*i*) illustrates an exemplary application where the silent routine parses the Latin-based string 604*a* and recognizes the element "H" as a silent element. Since "SH" and "S" are pronounced similarly, the silent-letter routine removes the silent element "H" from the phonetic spelling "SHAN" (604*a*), thereby generating the phonetic key "SAN" (606*a*).

Another exemplary routine that may be used in the phonetic encoding process is the sounds-like routine. The sounds-like routine may include parsing a Latin-based string and replacing any element that has a corresponding sounds-alike element. Like silent letters, the sounds-alike mapping may be pre-defined according to the type of language processed, and stored in a data structure (e.g., look-up table). For example, in the context of Chinese language, "X" may be replaced by a sounds-alike element "S," and "J" may be replaced by a sounds-alike element "Z." Other types of replacement rules are also useful.

Figure 6B:
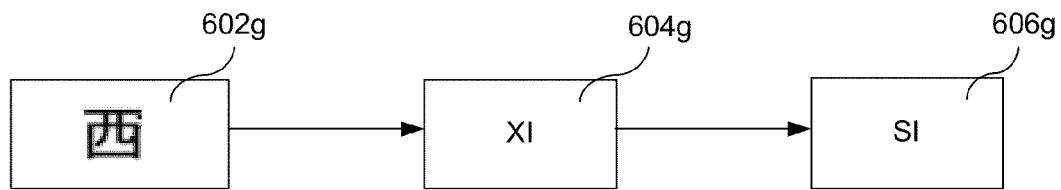
Figure 6B:
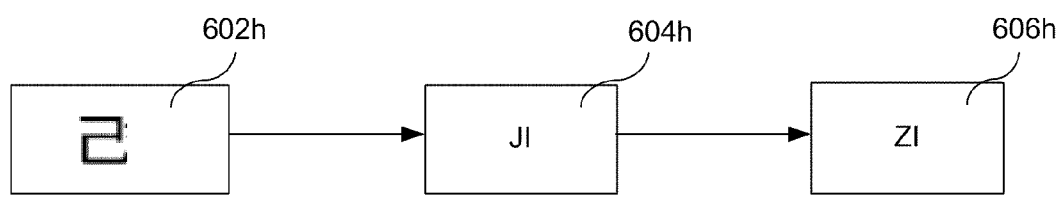
Figure 6B:
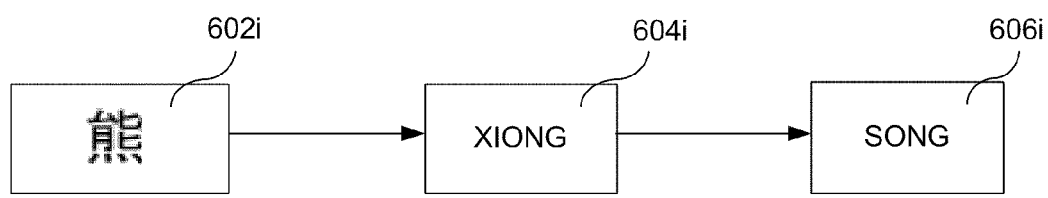

FIG. 6b illustrates various examples of replacing sounds-alike elements. In FIG. 6b(*i*), for example, the Latin-based string "XI" may be converted to the phonetic key "SI" by replacing the element "X" with its sounds-alike element "S." In another example shown in FIG. 6b(*ii*), the letter "J" may be replaced by its sounds-alike letter "Z" to generate the phonetic key "ZI" (606*h*). In yet another example illustrated in FIG. 6b(*iii*), the silent routine removes the element "I" and the sounds-like routine replaces the letter "X" with its sounds-alike element "S" to derive the phonetic key "SONG" (606*i*).

Figure 6C:
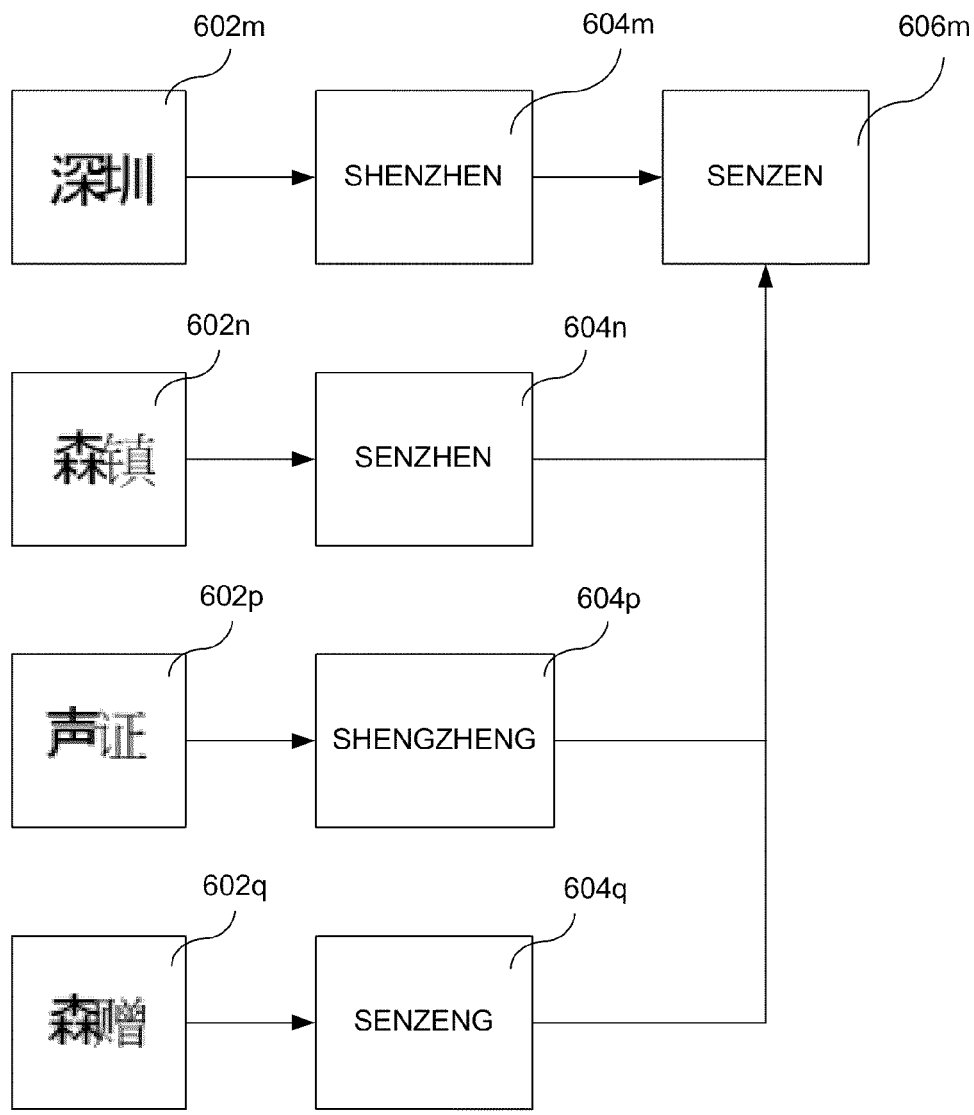

FIG. 6c illustrates an exemplary conversion of similar-sounding language text (602*m*, 602*n*, 602*p* and 602*q*) to a common phonetic key (606*m*). By generating the same phonetic key for similar-sounding language text, the system 100 is able to correct minor errors in the input data. For example, in an address cleansing application, the user may erroneously input language text 602*p* or Latin-based string 604*p* in an address field. By using the common key 606*m*, the system 100 will be able to correct the input data with the character string 602*m*, which is determined to be a valid string for an address field.

Figure 6D:
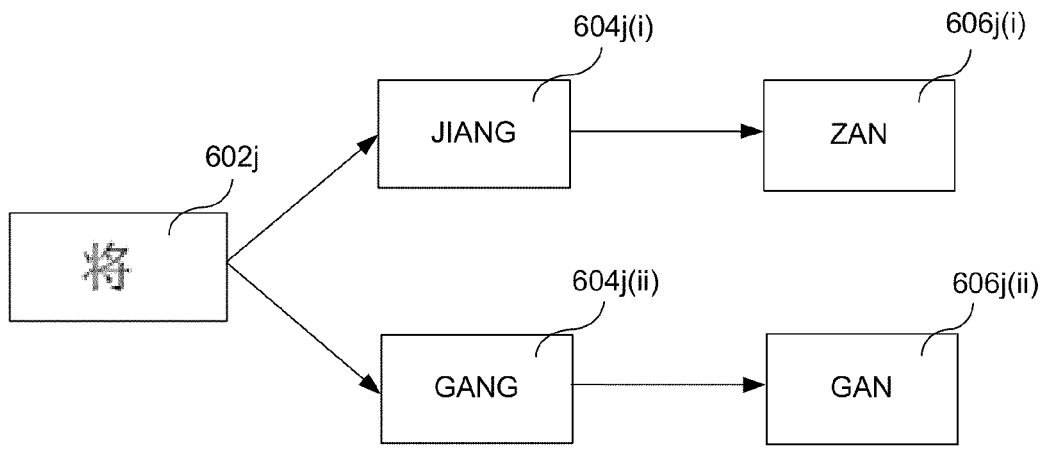
Figure 6D:
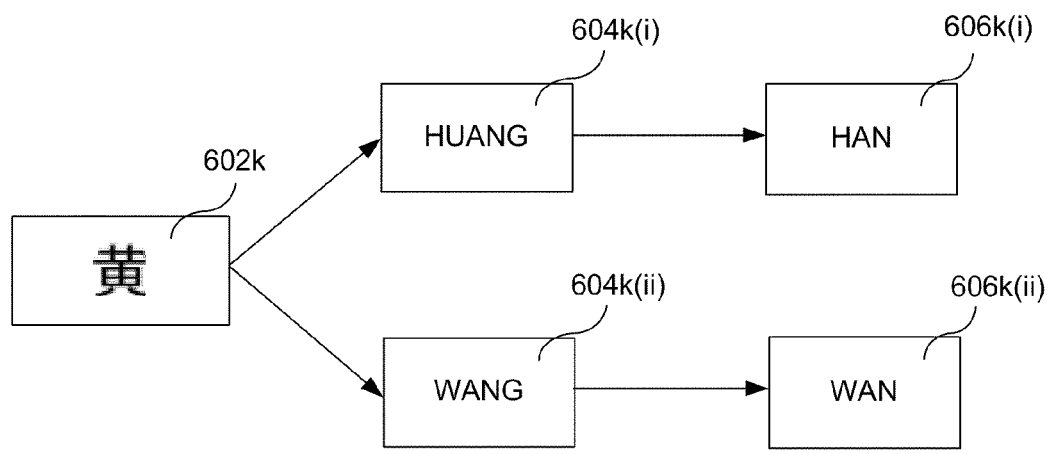

FIG. 6d(*i*) shows an exemplary mapping of an ideographic element 602*j* to multiple phonetic keys 606*j*(*i*)-(*ii*). The generation of multiple phonetic keys advantageously provides dialect support. In the context of Chinese language, dialects may include, but are not limited to, Shanghainese, Cantonese, Taiwanese, Hakka, Hokkien, Teochew, Hainanese, etc. Referring to FIG. 6d(*i*), for example, the standard Mandarin pronunciation of the character 602*j* is "JIANG" (604*j*(*i*)), while people from Shanghai pronounce the same Chinese character 602*j* as "GANG" (604*j*(*ii*)). Thus, two phonetic keys "ZAN" and "GAN" (606*j*(*i*)-(*ii*)) may be derived from the respective Latin-based input strings (604*j*(*i*)-(*ii*)). FIG. 6d(*ii*) shows another example of multiple phonetic-key generation. The ideographic element 602*k* may be pronounced as "HUANG" (604*k*(*i*)) in standard Mandarin, and "WANG" (604*k*(*ii*)) in Cantonese. Thus, two phonetic keys "HAN" and "WAN" (606*k*(*i*)-(*ii*)) may be generated for the respective dialects. It is understood that more than two phonetic keys may also be generated to accommodate other dialects.

Figure 6E:
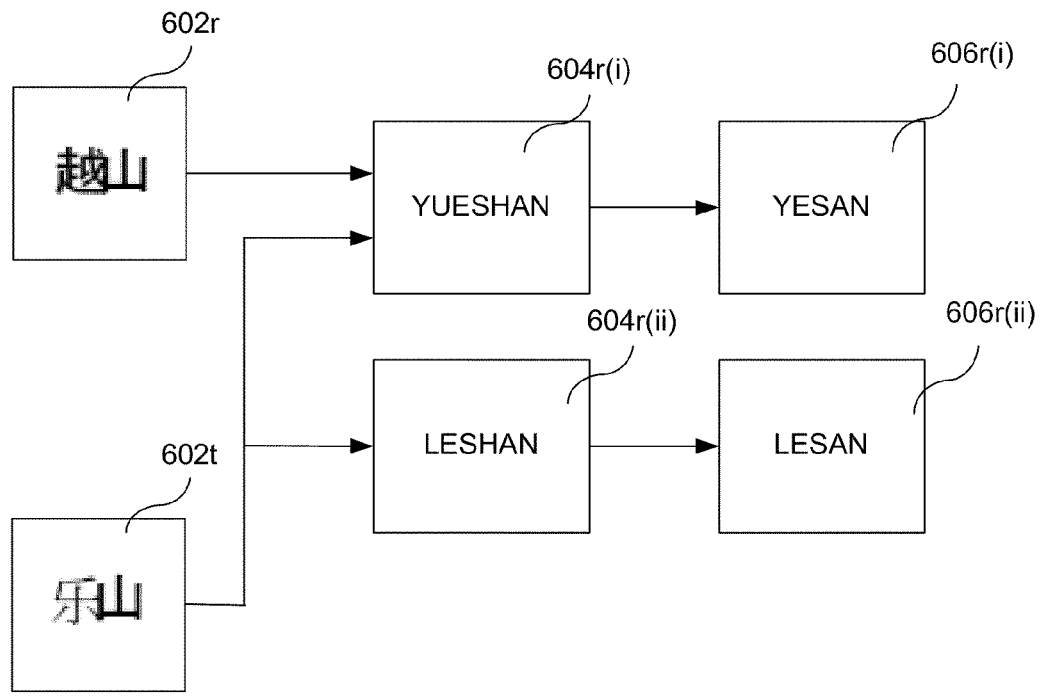

FIG. 6e shows yet another exemplary conversion of input data strings (606*r* and 602*t*) to phonetic keys (606*r*(*i*)-(*ii*)). In one exemplary scenario, the user may mistakenly enter the input data string 602*t*, intending to enter data string 602*r*. When the key builder 204 receives the input data string 602*t*, it generates the phonetic keys "YESAN" (606*r*(*i*)) and "LESAN" (606*r*(*ii*)). The retrieval engine 206 may first try using the phonetic key "LESAN" (606*r*(*ii*)) to search the reference database 218. Since no records in the reference database 218 are indexed with "LESAN," no candidate record is returned. The retrieval engine 206 may then try using the phonetic key "YESAN" (606*r*(*i*)) to search the reference database 218. Candidate record ID=1 is returned since it is indexed by the same phonetic key "YESAN." The matching module 208 determines the match score between the Latin-based representation of the language text of candidate record ID=1 (i.e. "YUESHAN") and the Latin-based input data (i.e. "YUESHAN" or "LESHAN") 604*r*(*i*)-(*ii*). A match score of 100 will be obtained for one of the pronunciations "YUESHAN" (604*r*(*i*)). The input data string 602*t* may be replaced by the language text 404 of the candidate record (ID=1).

In accordance with some implementations, the key builder 204 is configured to generate a radical key. A radical key is a Latin-based string that is derived based on the set of Latin characters or alphas generated by the conversion engine 202. As discussed previously, each Latin character or alpha may represent a constituent radical of an ideographic element. In some implementations, the radical key comprises the set of Latin characters generated by the conversion engine 202 with no modifications. Alternatively, various rules may be heuristically pre-defined to convert the set of Latin characters to a radical key. For example, referring to FIG. 3b, similar-looking radicals 330 may be grouped together and mapped to a common alpha (e.g., "U"). In other words, the key builder 204 may be configured to parse the set of Latin characters and replace any character associated with a radical that has a corresponding looks-alike radical. Thus, similar looking ideographic characters 211e and 211f are converted to a common radical key (e.g., UTFQ) by replacing "I" with "U". This advantageously introduces some "fuzziness" in the search and retrieval of candidate records. Multiple radical keys may also be generated for a single input data string according to the different types of groupings.

In some implementations, the key builder 204 is configured to generate a stroke key. A stroke key is a Latin-based string that is derived based on the set of Latin characters or digits generated by the conversion engine 202. As discussed previously, each Latin character or digit may represent a constituent stroke of an ideographic element. In some implementations, the stroke key comprises the set of Latin characters generated by the conversion engine 202 with no modifications. Alternatively, various rules may be heuristically pre-defined to convert the set of Latin characters to a stroke key. In particular, the key builder 204 may be configured to parse the set of Latin characters and replace any character associated with a stroke that has a corresponding looks-alike stroke. This advantageously enables fuzzy search and retrieval of candidate records with similar-looking language text using a common stroke key.

Referring back to FIG. 5, at 508, the retrieval engine 206 searches the reference database 218 for one or more candidate records from the reference database 218 that indexed by the one or more keys generated by the key builder 204. As discussed previously, the reference database 218 may be indexed with a phonetic key, a standard key, a radical key, a stroke key, or a combination thereof. Records with similar-sounding language text are indexed by a common phonetic key, while records with similar-looking language text are indexed by a common standard key, radical key or stroke key. The retrieval engine 206 may issue a query statement using a phonetic key to retrieve candidate records with language text that sounds similar to the language text of the input data. The retrieval engine 206 may also issue query statements using a radical or a stroke key to retrieve candidate records with language text that looks similar to the language text of the input data. The language text of the candidate records may be used to replace and thereby correct the input data, assuming that the input data contains errors. Such errors may have been introduced while using, for example, a radical input method (e.g., WUBI input method), a phonetic input method (e.g., PINYIN input method) or other input methods.

At 510, if one or more candidate records are found or returned by the search, the matching module 208 determines the match scores of the candidate records. The match score of each candidate record represents how similar the language text of the input data and the language text of the candidate record are. In some implementations, the similarity is determined by comparing the Latin-based input data string and the Latin-based representation of the language text in a candidate record. Such Latin-based representation may be generated on-the-fly by the conversion engine 202, as described previously. Alternatively, the Latin-based representation may be stored in the reference database.

The matching module 208 may determine a match score of a candidate record by computing the edit distance between the Latin-based input data string and the Latin-based representation of the candidate record data. The edit distance between two data strings is the number of operations required to transform one data string into the other. There are various ways to define an edit distance. One type of edit-distance metric is the Levenshtein distance, which is defined as the least number of edit operations that are necessary to modify one string to obtain another string. The edit operation may be an insertion, deletion, or substitution of a single character. Variations of the Levenshtein distance, such as the Hamming distance or the Damerau-Levenshtein distance, may also be used. In addition, other types of non edit-distance metrics for computing the match score may also be used.

Figures 7A, 7B:
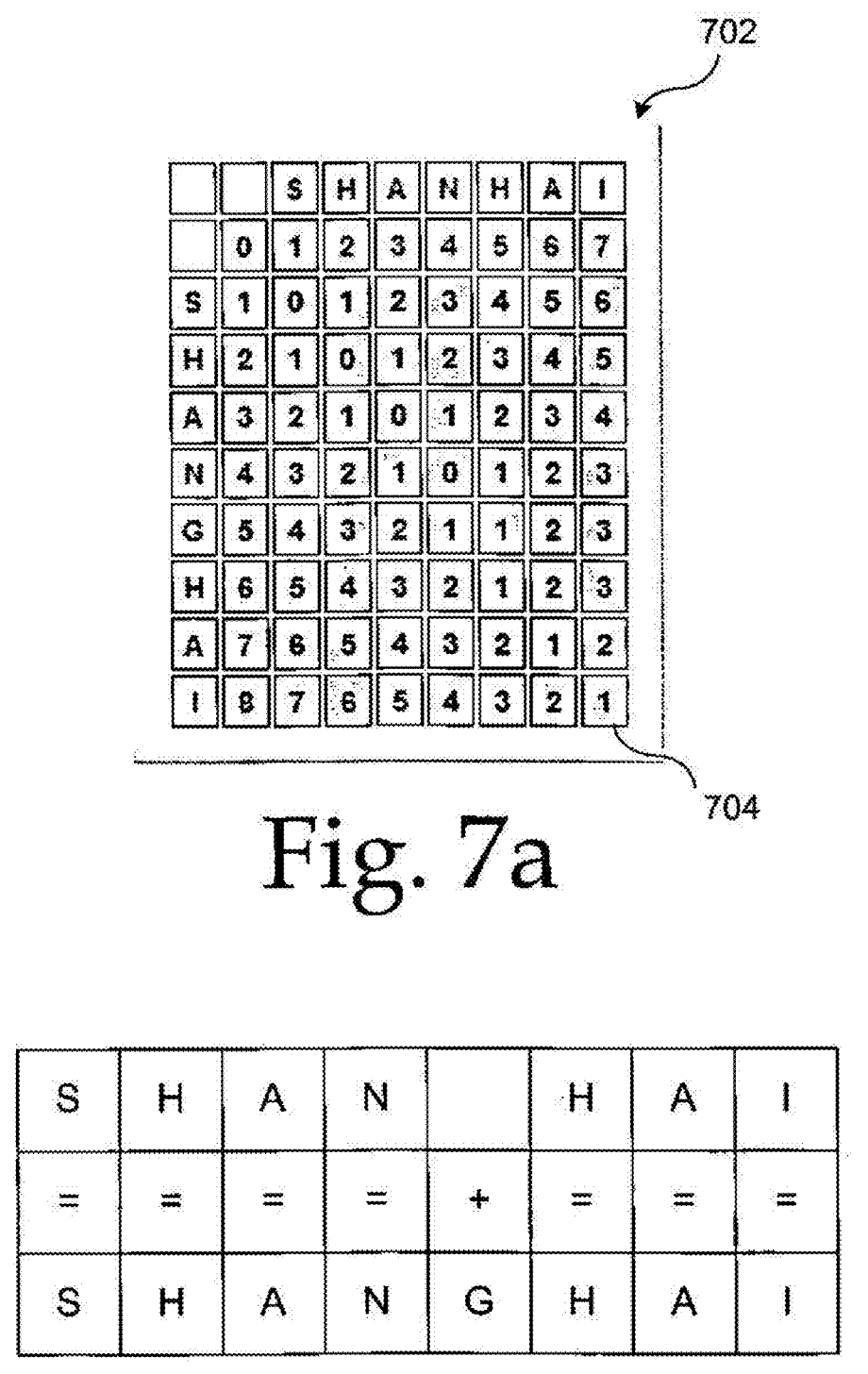

FIG. 7a shows an example of a matrix 702 that may be used to compute the Levenshtein distance between an exemplary input data string "SHANHAI" and an exemplary candidate data string "SHANGHAI." The matrix 702 is initialized, such that each (m, n) cell of the matrix measures the Levenshtein distance between the m-character prefix of one data string and the n-character prefix of the other data string. The number in the lower right corner 704 is the Levenshtein distance between the two data strings. The matrix may be filled from the upper left to the lower right corner. Each horizontal or vertical jump corresponds to an insert or a delete, respectively. The cost is normally set to 1 for each edit operation. The diagonal jump can cost either: 1, if the two characters in the row and column do not match; or 0, if they do. Each cell always minimizes the cost locally.

FIG. 7b shows a possible path through the matrix 702 that produces the least cost solution. This cost is computed as the sum of the cost of the individual operations needed for the transformation. It should be noted that the symbol "=" denotes a Match; "o" denotes a Substitution; "+" denotes an Insertion; and "−" denotes a Deletion. As shown, the transformation from "SHANHAI" to "SHANGHAI" requires one modification, which adds a "G" to the input data string "SHANHAI." Thus, the edit distance is 1, as indicated by the number in the lower right corner 704 of the matrix 702.

The match score may be computed by normalizing the edit distance. One exemplary way of normalizing the edit distance is by mapping the edit distance value to a value between 0 and 100. It is understood that other ranges, such as 0 to 1, may also be used. Equation (1) illustrates an exemplary normalization technique for computing the match score (Match_Score) based on the edit distance (distance):

$$\text{Match\_Score}=100-(100*\text{distance}/(\text{Len1}+\text{Len2})) \quad (1)$$

where Len1 is the length of the input data string, and Len2 is the length of the candidate data string. Therefore, referring to the example illustrated in FIG. 9a, wherein the length of the Latin-based input string "SHANGHAI" (corresponding to input data 1101) is 8, the length of the expected string "SHANHAI" (corresponding to candidate data 1102b) is 7 and the distance is 1, the resulting match score may be computed as (100−(100*1/(7+8)))=93.

The Levenshtein distance computation method may also be directly applied to the examples previously described with respect to FIGS. 3b-c. For example, referring to FIG. 3b, two look-alike characters 211e-f may be compared by computing the Levenshtein distance between the respective radical keys "ITFQ" and "UTFQ". Since the radical keys differ only by one letter and are therefore very similar, a high match score (e.g., 95) may be obtained. Similarly, in FIG. 3c, the Levenshtein distance between the stroke keys may yield a high match score (e.g., 95) for look-alike characters 211g-h.

In accordance with some implementations, steps 508 and 510 are performed iteratively until a match is found. More particularly, the retrieval engine 206 may be configured to use a first key generated by the key builder 204 to retrieve one or more candidate records. The matching module 208 then evaluates the match scores for the retrieved candidate records.

If a good enough candidate record is not found, the retrieval engine 206 uses a second key to retrieve candidate records, and the corresponding matches scores are determined by the matching module, and so forth. A keying strategy may be provided to determine the sequence of keys being used to retrieve potentially matching candidates. For example, the primary key is tried first, followed by the secondary keys. Such keying strategy advantageously increases the computational efficiency by avoiding further searching once a good enough candidate record is found.

Figure 8:
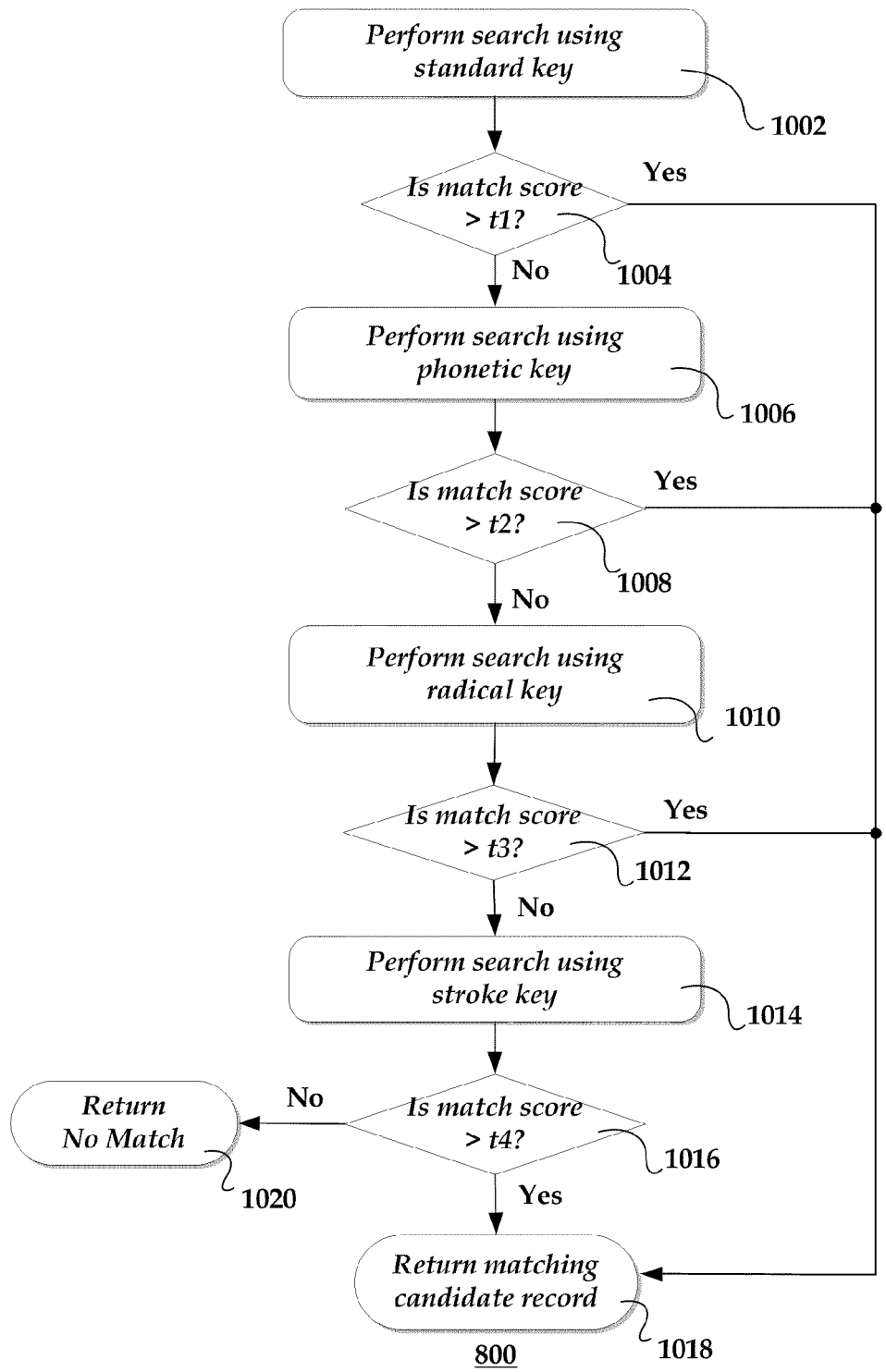
FIG. 8 is a flow chart illustrating an exemplary keying method.

FIG. 8 is a flow chart illustrating an exemplary keying method 800. The keying method 800 generally causes the retrieval engine 206 to search the reference database 218 using one of a plurality of keys generated by the key builder 204 based on the input data. Searching (step 508) and matching (step 510) are iteratively performed until a candidate record with a match score exceeding a predetermined threshold is found. The retrieval engine 206 may perform the search by issuing a query statement (e.g., SQL statement) based on the given look-up key, as described previously. For purposes of illustration, the search is herein described in the context of a standard key, a phonetic key, a radical key and a stroke key. However, any combination or ordering of keys may be used. For example, to provide dialect support, multiple phonetic keys may be used. The primary phonetic key may be tried first, followed by the secondary phonetic keys.

Referring to FIG. 8, at 1002, the reference database 218 is searched using the standard key. More particularly, the retrieval engine 206 may issue a query statement which includes the standard key to initiate the search. If the search or query returns one or more candidate records which are indexed by same standard key, the matching module 208 then evaluates the match score of each candidate record. At 1004, if the match score exceeds a first predetermined threshold t1 (e.g., 90), then the current candidate record is returned as a matching record at 1018. If the match score is less than the first predetermined threshold t1, the search is performed using the phonetic key at 1006.

At 1008, if the match score of a current candidate record exceeds a second predetermined threshold t2 (e.g., 80), then the candidate record is returned as a matching record at 1018. If not, the retrieval engine 206 proceeds to perform the search using a radical key at 1010. At 1012, if the match score exceeds a third predetermined threshold t3 (e.g., 80), then the current candidate record is returned as a matching record at 1018. If not, the search is performed using a stroke key at 1016. Finally, if the match score exceeds a fourth predetermined threshold t4 (e.g., 80), the current candidate is returned as a match at 1018. If not, a "no match" result is indicated at 1020.

It should be noted that the first, second, third, and fourth predetermined thresholds (t1, t2, t3, t4) may be predefined with the same or different values. In addition, the framework may return one or more candidate records with a match score that is above a fifth predetermined threshold.

Referring back to FIG. 5, at 512, the matching module 208 presents the output results. The output results may include language text from the best matching candidate record, or a suggestion list of candidate records with good enough match scores (i.e. above a certain predetermined threshold). In some implementations, the system 100 presents the output results to a user via an output device (e.g., computer monitor). A user interface may be used by the user as a means for picking the candidate string to replace the input string. Alternatively, the system 100 may automatically replace the input string with the candidate string that is associated with the highest match score.

Exemplary Applications

The previously described exemplary search and match techniques may be applied to various different applications. For example, the exemplary search and match techniques may be applied to data cleansing applications to improve the quality of customer's data. One example of such data cleansing application is address cleansing, which validates input data entered in the address field of customer data records. Other types of records and data fields, such as the name, phone number or product part description in sales records, may also be validated.

The input data may be validated via batch mode, or via a web application which allows the user to input data. Validation may be performed against truth information stored in a reference database. The truth information may be internal to the data warehouse (e.g., customer database) or obtained from external sources (e.g., valid addresses from postal offices). Errors in the input data fields may be corrected by identifying the correct reference data from the reference database before the data is stored. A suggestion list of potentially correct candidates may be presented to the user for selection. Alternatively, the best matching candidate may be presented to the user.

FIG. 9a illustrates an exemplary address cleansing application. FIG. 9b shows a portion of an exemplary reference database 218, which includes truth information (e.g., valid addresses). The present framework ascertains if the input data 1101 describes a valid address by fuzzily matching the input data 1101 against candidate data strings 1102a-b retrieved from the reference database 218. If the fuzzy search returns a candidate string from the reference database 218 that exactly matches the input data 1101, then the input data would have been validated. If the fuzzy search returns a candidate string that is reasonably similar to the input data 1101 (i.e. match score above a pre-determined threshold), the input data may be corrected or replaced with the candidate string. Otherwise, the input data may be routed for further cleansing before storing it in the database.

As shown in FIG. 9b, each locality record in the reference database 218 may be indexed by multiple lookup keys (1104, 1106, 1108, 1110). Each record may comprises key fields for storing a standard key (1104), a phonetic key (1106), a radical key (1108) and a stroke key (1110). The keys may be generated from the language text in the locality field (1102) by using the exemplary techniques previously described herein.

The keying method 800 previously described with reference to FIG. 8 may be applied to the exemplary application shown in FIGS. 9a-b. For example, the retrieval engine 206 may perform a search of the reference database 218 by using the standard key derived from the input data 1101. If no matching candidate records are found, the phonetic key is used to perform the search. The fuzzy search may retrieve two candidate strings 1102a-b, which yield a match score of 100 and 95 respectively, as shown in FIG. 9a. Thus, two sounds-alike candidates may be presented in an output suggestion list, with the candidate 1102a as the best match. Since the match scores are reasonably high, the radical key and the stroke key are not used in the fuzzy search. However, in other cases, the radical key and/or stroke key may be used if a reasonably high match score is not found.

One major advantage of the present framework is that similar candidates from the reference database may still be identified despite input errors caused by misspelling or mistyping the pronunciation, strokes or radicals that make up the characters in the input data. Another significant advantage of the present framework is its ability to support multiple dialects. This is particularly useful in, for example, phone communications where the customer orders goods from a telephone operator. The customer's dialect may make it difficult for the telephone operator to understand the customer's order. With the phonetic fuzzy search, the order information may be validated by comparing the input against truth information in the reference database.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for facilitating searching and matching of data, comprising:
   receiving an input data string including one or more ideographic elements;
   converting the input data string to a Latin-based input data string;
   generating one or more input keys based on the Latin-based input data string, including removing any non-space silent element from the input data string to generate a phonetic key;
   searching, using the one or more input keys, a reference database stored in a memory device for one or more candidate records, wherein similar records in the database are indexed by a common lookup key; and
   if the one or more candidate records are found, determining a match score of the one or more candidate records.

2. The method of claim 1 wherein the one or more ideographic elements comprise one or more Chinese, Japanese, Korean or Vietnamese characters.

3. The method of claim 1 wherein the converting the input data string to the Latin-based input data string comprises converting the input data string to one or more phonetic spellings of the one or more ideographic elements.

4. The method of claim 3 wherein the generating the one or more input keys comprises generating a phonetic key based on at least one of the one or more phonetic spellings.

5. The method of claim 3 wherein the generating the one or more input keys comprises generating multiple phonetic keys based on multiple phonetic spellings.

6. The method of claim 1 wherein the silent element comprises a letter "H," "G," "I," or "U."

7. The method of claim 4 wherein the generating the phonetic key comprises replacing any element in one of the one or more phonetic spellings that has a corresponding sounds-alike element.

8. The method of claim 1 wherein the converting the input data string to the Latin-based input data string comprises converting the input data string to one or more sets of Latin characters, wherein a Latin character represents a constituent radical of the one or more ideographic elements.

9. The method of claim 8 wherein the generating the one or more input keys comprises generating one or more radical keys based on the one or more sets of Latin characters.

10. The method of claim 9 wherein the generating the one or more radical keys comprises replacing any Latin character in the set of Latin characters that is associated with a radical that has a corresponding looks-alike radical.

11. The method of claim 1 wherein the converting the input data string to the Latin-based input data string comprises converting the input data string to one or more sets of Latin characters, wherein a Latin character represents a constituent stroke of the one or more ideographic elements.

12. The method of claim 11 wherein the constituent stroke comprises a horizontal stroke, a vertical stroke, a left-falling stroke, a right-falling stroke or a turning stroke.

13. The method of claim 12 wherein the generating the one or more input keys comprises generating one or more stroke keys based on the one or more sets of Latin characters.

14. The method of claim 13 wherein the generating the one or more stroke keys comprises replacing any Latin character in the set of Latin characters that is associated with a stroke that has a corresponding looks-alike stroke.

15. The method of claim 1 wherein the reference database comprises an index table, wherein each record in the index table comprises a standard key, a phonetic key, a radical key, a stroke key, or a combination thereof.

16. The method of claim 1 wherein the searching the reference database comprises issuing a query statement based on at least one of the one or more input keys.

17. The method of claim 16 wherein the query statement comprises a structured query language (SQL) statement.

18. The method of claim 1 wherein the determining the match score comprises determining an edit distance between the Latin-based input data string and a Latin-based representation of a language text string in the one or more candidate records.

19. The method of claim 18 further comprising converting the language text string to the Latin-based representation.

20. The method of claim 19 wherein the Latin-based representation comprises a phonetic spelling of the language text string.

21. The method of claim 19 wherein the Latin-based representation comprises a set of Latin characters, wherein a Latin character represents a radical of the language text string.

22. The method of claim 19 wherein the Latin-based representation comprises a set of Latin characters, wherein a Latin character represents a stroke of the language text string.

23. The method of claim 18 wherein the edit distance comprises a Levenshtein distance.

24. The method of claim 18 wherein the determining the match score comprises normalizing the edit distance.

25. The method of claim 1 further comprising generating multiple input keys based on the input data string.

26. The method of claim 25 wherein the searching the reference database and the determining the match score are iteratively repeated by using one of the multiple input keys until a candidate record is found where the match score exceeds a predetermined threshold.

27. The method of claim 1 further comprising presenting a suggestion list of one or more language text strings of one or more candidate records with highest match scores.

28. A non-transitory computer usable medium having a computer readable program code tangibly embodied therein, the computer readable program code adapted to be executed by a processor to implement a method for facilitating searching and matching of data, comprising:
   receiving an input data string including one or more ideographic elements;
   converting the input data string to a Latin-based input data string;
   generating one or more input keys based on the Latin-based input data string, including removing any non-space silent element from the input data string to generate a phonetic key;
   searching, using the one or more input keys, a reference database for one or more candidate records, wherein similar records in the database are indexed by a common lookup key; and if the one or more candidate records are found, determining a match score of the one or more candidate records.

29. The computer usable medium of claim 28 wherein the one or more ideographic elements comprise one or more Chinese, Japanese, Korean or Vietnamese characters.

30. The computer usable medium of claim 28 wherein the generating the one or more input keys comprises generating a phonetic key based on at least one of one or more phonetic spellings of the one or more ideographic elements.

31. The computer usable medium of claim 28 wherein the generating the one or more input keys comprises generating one or more radical keys based on one or more sets of Latin characters, wherein a Latin character represents a constituent radical of the one or more ideographic elements.

32. The computer usable medium of claim 28 wherein the generating the one or more input keys comprises generating one or more stroke keys based on one or more sets of Latin characters, wherein a Latin character represents a constituent stroke of the one or more ideographic elements.

33. The computer usable medium of claim 28 wherein the silent element comprises a letter "H," "G," "I," or "U."

34. A system for facilitating searching and matching of data, comprising:
   a non-transitory memory device for storing computer readable program code; and
   a processor in communication with the memory device, the processor being operative with the computer readable program code to:
      receive an input data string including one or more ideographic elements;
      convert the input data string to a Latin-based input data string;
      generate one or more input keys based on the Latin-based input data string, including remove any non-space silent element from the input data string to generate a phonetic key;
      search, using the one or more input keys, a reference database for one or more candidate records, wherein similar records in the database are indexed by a common lookup key; and
      if the one or more candidate records are found, determining a match score of the one or more candidate records.

35. The system of claim 34 wherein the silent element comprises a letter "H," "G," "I," or "U."

36. The system of claim 34 wherein the one or more ideographic elements comprise one or more Chinese, Japanese, Korean or Vietnamese characters.

37. The system of claim 34 wherein the processor is further operative with the computer readable program code to generate the one or more input keys by generating a phonetic key based on at least one of one or more phonetic spellings of the one or more ideographic elements.

38. The system of claim 34 wherein the processor is further operative with the computer readable program code to generate the one or more input keys by generating one or more radical keys based on one or more sets of Latin characters, wherein a Latin character represents a constituent radical of the one or more ideographic elements.

39. The system of claim 34 wherein the processor is further operative with the computer readable program code to generate the one or more input keys by generating one or more stroke keys based on one or more sets of Latin characters, wherein a Latin character represents a constituent stroke of the one or more ideographic elements.

* * * * *